(12) United States Patent
Chiang et al.

(10) Patent No.: US 8,184,667 B2
(45) Date of Patent: May 22, 2012

(54) ELECTRO-OPTIC BRAGG DEFLECTOR AND METHOD OF USING IT AS LASER Q-SWITCH IN AN ACTIVELY Q-SWITCHED LASER AND AN ACTIVELY Q-SWITCHED WAVELENGTH-CONVERSION LASER

(75) Inventors: An-Chung Chiang, Hsinchu (TW);
Shou-Tai Lin, Hsinchu (TW);
Yen-Chieh Huang, Hsinchu (TW);
Yen-Yin Lin, Hsinchu (TW); Guey-Wu Chang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 12/964,014

(22) Filed: Dec. 9, 2010

(65) Prior Publication Data
US 2011/0075688 A1    Mar. 31, 2011

Related U.S. Application Data

(63) Continuation-in-part of application No. 12/038,839, filed on Feb. 28, 2008, now abandoned.

(30) Foreign Application Priority Data

Aug. 29, 2007   (TW) ............................... 96132147 A

(51) Int. Cl.
*H01S 3/11*   (2006.01)
*H01S 3/115*  (2006.01)
*H01S 3/10*   (2006.01)

(52) U.S. Cl. ................. 372/10; 372/12; 372/21; 372/26

(58) Field of Classification Search ................. 372/10, 372/12, 21, 26
See application file for complete search history.

(56) References Cited

U.S. PATENT DOCUMENTS

| 4,308,506 | A  | * | 12/1981 | Ellis .............................. 372/13 |
| 6,673,497 | B2 | * | 1/2004 | Efimov et al. .................... 430/1 |
| 6,904,066 | B2 |   | 6/2005 | Huang et al. |
| 2003/0123497 | A1 | * | 7/2003 | Huang et al. .................... 372/21 |

OTHER PUBLICATIONS

Lin et al., "Electro-optic Periodically Poled Lithium Niobate Bragg Modulator as a Laser Q-switch," Opt. Lett. vol. 32, No. 5, pp. 545-547 (2007).

* cited by examiner

*Primary Examiner* — Patrick Stafford
(74) *Attorney, Agent, or Firm* — Volpe and Koenig, P.C.

(57) ABSTRACT

The configurations of an electro-optic Bragg deflector and the methods of using it as a laser Q-switch in a Q-switched laser and in a Q-switched wavelength-conversion laser are provided. As a first embodiment, the electro-optic Bragg deflector comprises an electrode-coated electro-optic material with one of a 1D and a 2D spatially modulated electro-optic coefficient. When a voltage is supplied to the electrodes, the electro-optic material behaves like a Bragg grating due to the electro-optically induced spatial modulation of the refractive index. The second embodiment relates to an actively Q-switched laser, wherein the electro-optic Bragg deflector functions as a laser Q-switch. The third embodiment of the present invention combines the Q-switched laser and a laser-wavelength converter to form a Q-switched wavelength-conversion laser, wherein the EO Bragg deflector can be monolithically integrated with a quasi-phase-matching wavelength converter in a fabrication process.

18 Claims, 19 Drawing Sheets

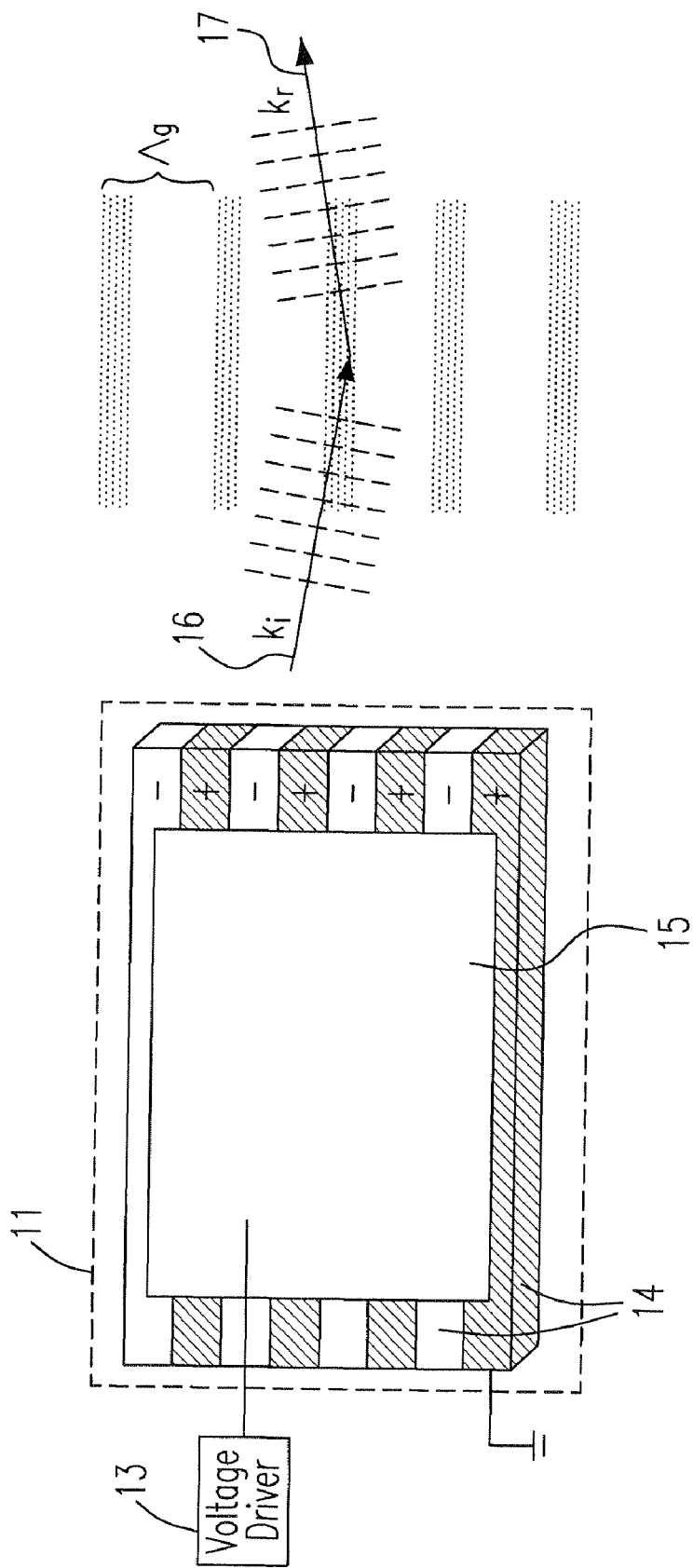

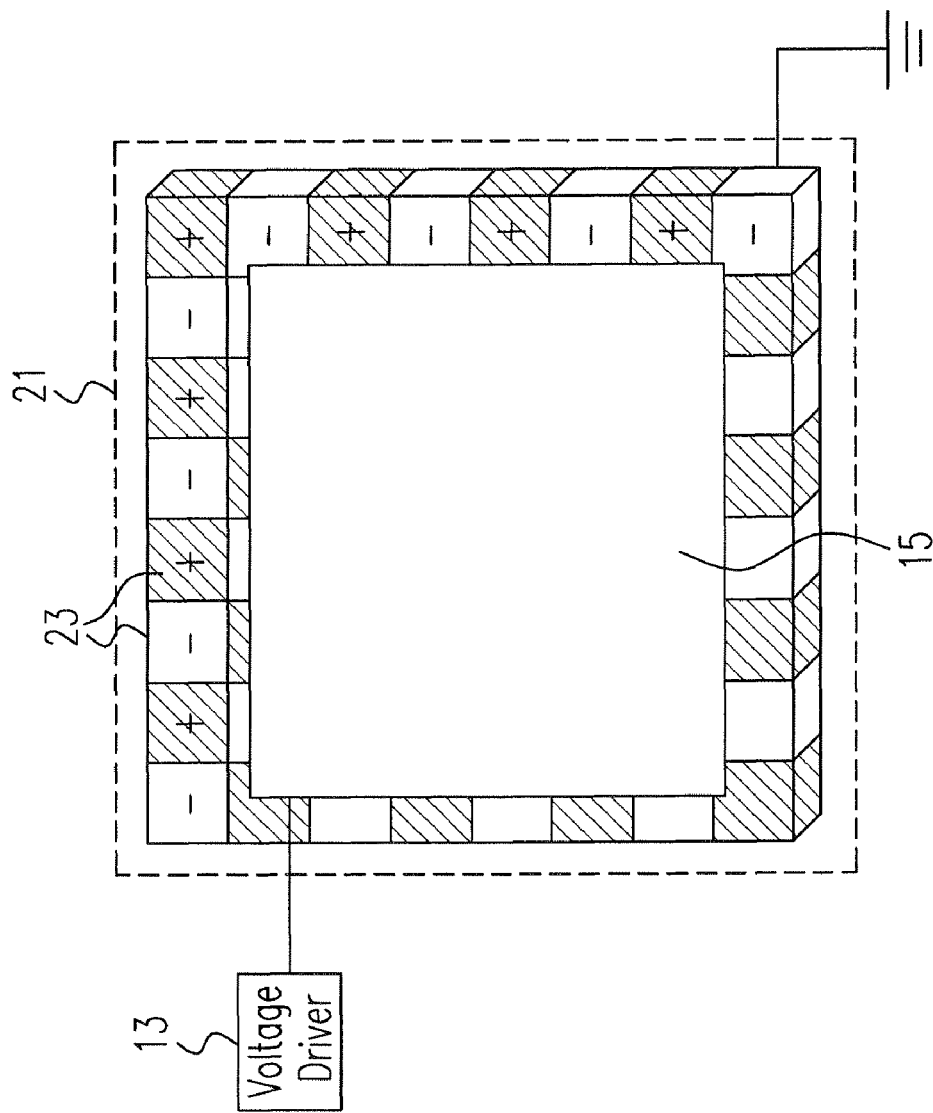

ELECTRO-OPTIC BRAGG DEFLECTOR AND METHOD OF USING IT AS LASER Q-SWITCH IN AN ACTIVELY Q-SWITCHED LASER AND AN ACTIVELY Q-SWITCHED WAVELENGTH-CONVERSION LASER

FIELD OF THE INVENTION

The present invention is a CIP application of the parent application "ELECTRO-OPTIC BRAGG DEFLECTOR AND METHOD OF USING IT AS LASER Q-SWITCH IN A Q-SWITCHED LASER AND A Q-SWITCHED WAVELENGTH-CONVERSION LASER" bearing on the Ser. No. 12/038,839, filed on Feb. 28, 2008, which is incorporated herein by reference as if fully set forth. The present invention relates to an electro-optic Bragg deflector. In particular, it relates to the use of the electro-optic Bragg deflector as a laser Q-switch for an actively Q-switched laser and for an actively Q-switched wavelength-conversion laser.

BACKGROUND OF THE INVENTION

With the rapid advancement of the laser technologies, laser sources are becoming more compact and efficient. For instance, a diode laser is a popular laser source because of its small size, low-power consumption, and ease of mass production; however, the emission wavelength of a diode laser is limited by material properties or, more specifically, by the quantum energy levels of the laser gain medium. A diode-laser pumped solid-state (DPSS) laser is also playing an important role in various laser applications due to its superior properties in, for example, generating high peak power and good laser-mode profiles. A DPSS laser comprises a laser gain medium absorbing the pump-diode laser energy and a laser cavity resonating the emission wave from the laser gain medium. In such a configuration, lasers of different wavelengths can be generated by using different laser gain media in suitable laser resonators. Since the laser wavelength is fixed to the available energy levels of a laser material, the wavelength of a DPSS laser employing a certain laser gain medium can not be arbitrarily tuned.

A nonlinear optical process allows laser frequency mixing to generate new laser frequencies or wavelengths that are not generally available from the quantum energy levels of a laser material. Therefore, a wavelength-tunable coherent light source can be implemented by installing a nonlinear optical material inside or outside a laser cavity. Second-order nonlinear wavelength conversion utilizes the second-order ($\chi^{(2)}$) nonlinear susceptibility of a nonlinear optical material and is usually an easier process compared with a third-order nonlinear wavelength conversion process. Among the second-order nonlinear wavelength-conversion processes, for example, an optical parametric process can provide broad laser-wavelength tuning. In $\chi^{(2)}$-based nonlinear wavelength conversion, phase-matching among mixing waves is required, and is often achieved in a birefringence nonlinear-optical material with carefully arranged polarization and propagation directions of the mixing optical waves. Such a stringent phase-matching requirement usually sacrifices the largest available nonlinear coupling coefficient in a given nonlinear optical material and limits the energy conversion efficiency of laser wavelength conversion. In recent years, the so-called quasi-phase matching (QPM) technique has removed the aforementioned limitation by compensating the phase mismatch of the mixing waves in a nonlinear optical material by using a spatially modulated nonlinear coefficient. Such a QPM technique allows a laser-wavelength-conversion process to access the maximum nonlinear coefficient of a nonlinear optical material and thus to obtain much higher wavelength-conversion efficiency.

Many important laser applications require high peak laser power with a short laser pulse width. In particular, a high laser power can greatly increases the conversion efficiency of nonlinear laser-wavelength conversion. Laser Q-switching is a common way of obtaining a high peak laser power from a laser source.

Q-switching is a popular scheme for generating nanosecond and high-peak-power laser radiations. The working principle of a Q-switched laser is based on a technique, with which the laser energy is accumulated in a time period comparable to the upper-level lifetime of the laser gain medium and is released in a short period of time to generate the high-power laser pulse. During the laser energy storage, the laser cavity is kept in a high-loss or a low-Q state. A fast switching from the low-Q to a low-loss or a high-Q state for the laser cavity to release the stored energy in a short laser pulse. In general, there are two laser Q-switching schemes, active Q-switching and passive Q-switching Compared with a passively Q-switched laser, an actively Q-switched laser is advantageous in handling a wider range of laser power and in controlling the timing of the generated laser pulses. Usually an actively Q-switched laser employs an acousto-optic (AO) Q-switch or an electro-optic (EO) Q-switch. An AO Q-switch requires a radio-frequency (RF) voltage driver and an EO Q-switch requires a pulsed high-voltage (in the kV range) driver. An AO Q-switch is usually a Bragg cell that deflects a light wave according to the Bragg deflection condition from an acousto-optic grating and can be fairly insensitive to laser's polarization. On the other hand, an EO Q-switch is usually a Pockels cell that utilizes a voltage pulse to control the polarization loss and thus the quality factor (the Q-factor) of a laser cavity. For fast laser Q-switching, EO switching is the preferred scheme due to its much faster response from the EO effect of an EO crystal.

The present invention is related to an EO Bragg deflector comprising an electrode-coated EO material with a spatially modulated EO coefficient forming a grating when an electric field is applied to the material. In particular, the present invention employs this EO Bragg deflector as a laser Q-switch that does not require a RF voltage driver, has a much lower Q-switch voltage than that of a conventional EO Q-switch based on polarization-loss control and using materials such as potassium dihydrogen phosphate (KDP), potassium titanyl phosphate (KTP), lithium niobate (LN), etc. Thus the present invention allows a compact and low-cost design for an actively Q-switched laser system. Since both an EO Bragg deflector and a QPM wavelength converter have spatially modulated $\chi^{(2)}$ nonlinear coefficients in the material, the EO Bragg deflector of the present invention can be easily integrated to a QPM nonlinear wavelength converter to perform simultaneous laser Q-switching and wavelength conversion for a laser source. The Q-switched wavelength-conversion laser is particularly simple, compact, and efficient, if the EO Bragg deflector of the present invention and the QPM laser-wavelength converter are integrated into a monolithic nonlinear-optical-material substrate in a single fabrication process.

To alleviate the drawbacks in the prior arts, the applicant carried out a major research-and-development effort to conceive an EO Bragg deflector and a method of using it as a laser Q-switch in an actively Q-switched laser and in an actively Q-switched wavelength-conversion laser.

SUMMARY OF THE INVENTION

It is a primary objective of the present invention to provide an EO Bragg deflector. It is a further objective of the present invention to provide an improved actively Q-switched laser system which adopts the EO Bragg deflector as a laser Q-switch. It is an additional objective of the present invention to provide a Q-switched wavelength-conversion laser source that is more compact and efficient for producing coherent laser radiations by integrating a wavelength converter, in particular a QPM wavelength converter, to the EO Bragg deflector in the Q-switched laser system.

These objectives are achieved by using an electro-optic apparatus that provides time-controlled Bragg deflection in a laser cavity for Q-switching a laser. According to a first preferred embodiment of the present invention, the apparatus in general comprises a voltage driver, an EO crystal with a spatially modulated EO coefficient, and a set of electrodes on the EO crystal. The voltage driver is connected to the set of the electrodes. Taking an electrode-coated periodically poled lithium niobate (PPLN) crystal as an example for the EO crystal, the refractive index of the PPLN crystal is modulated periodically when the voltage driver supplies an electric field along the crystallographic z direction of the crystal; hence, a light wave in the PPLN crystal is deflected by this grating-like refractive-index modulation when the incident angle of the light wave satisfies the Bragg condition.

According to a second preferred embodiment, the apparatus in general comprises a pump source, a laser gain medium, an EO Bragg deflector, a voltage driver, and a laser cavity. The laser gain medium and the EO Bragg deflector are installed inside a pre-aligned laser cavity. The voltage driver is connected to the electrodes of the EO Bragg deflector. Without a voltage applied to the EO Bragg deflector, the laser can oscillate at a resonant wavelength in the laser cavity, if the pump source provides enough energy to the laser gain medium. With a voltage applied to the EO Bragg deflector, the EO Bragg deflector misaligns the resonant wave in the laser cavity due to Bragg deflection, so the laser cavity is at its low-Q state (high-loss state). On the other hand, the EO Bragg deflector can not deflect the pre-aligned resonant wave without a suitable electric field in the EO crystal, so the laser cavity is at its high-Q state (low-loss state). In this embodiment, the EO Bragg deflector can switch the laser cavity between the low-Q and the high-Q states according to the on-off voltages from the voltage driver, so the second preferred embodiment is an effective Q-switched laser using the EO Bragg deflector as a laser Q-switch.

According to a third preferred embodiment, the apparatus in general comprises a pump source, a laser gain medium, an EO Bragg deflector, a voltage driver, a laser cavity, and a laser wavelength converter. In this embodiment, the laser wavelength converter is added to the second embodiment to convert the wavelength of the Q-switched laser to a different one. Taking the $\chi^{(2)}$-based wavelength converter as an example, this wavelength converter can be a second harmonic generator (SHG), optical parametric generator (OPG), optical parametric oscillator (OPO), sum frequency generator (SFG), difference frequency generator (DFG), or a combination of them. Since both the EO Bragg deflector and the $\chi^{(2)}$ laser-wavelength converter utilize the second-order susceptibility, they can be monolithically integrated in a single crystal substrate of a nonlinear-optical material. In particular, the fabrication process of an EO Bragg deflector can be fully compatible with that of a QPM wavelength converter. Integrating the two in a monolithic nonlinear-crystal substrate is straightforward.

The present invention can be best understood through the following descriptions with reference to the accompanying drawings, in which:

BRIEF DESCRIPTION OF THE DRAWINGS

FIGS. 1(a)-1(b) depict the schematic diagram of a one-dimensional (1D) EO Bragg deflector and the wave-vector-matching diagram of the Bragg diffraction/deflection according to a first preferred embodiment of the present invention;

FIGS. 2(a)-2(b) depict the schematic diagram of a two-dimensional (2D) EO Bragg deflector and its wave-vector-matching diagram of the Bragg diffraction/deflection according to a second preferred embodiment of the present invention;

DETAILED DESCRIPTION OF THE PREFERRED EMBODIMENT

Although the following description contains many specifications for the purposes of illustration, anyone of ordinary skill in the art will appreciate that many variations and alterations to the following details are within the scope of the invention. Accordingly, the following preferred embodiment of the invention is set forth without any loss of generality to and without imposing limitations upon, the claimed invention.

Figure 1B:
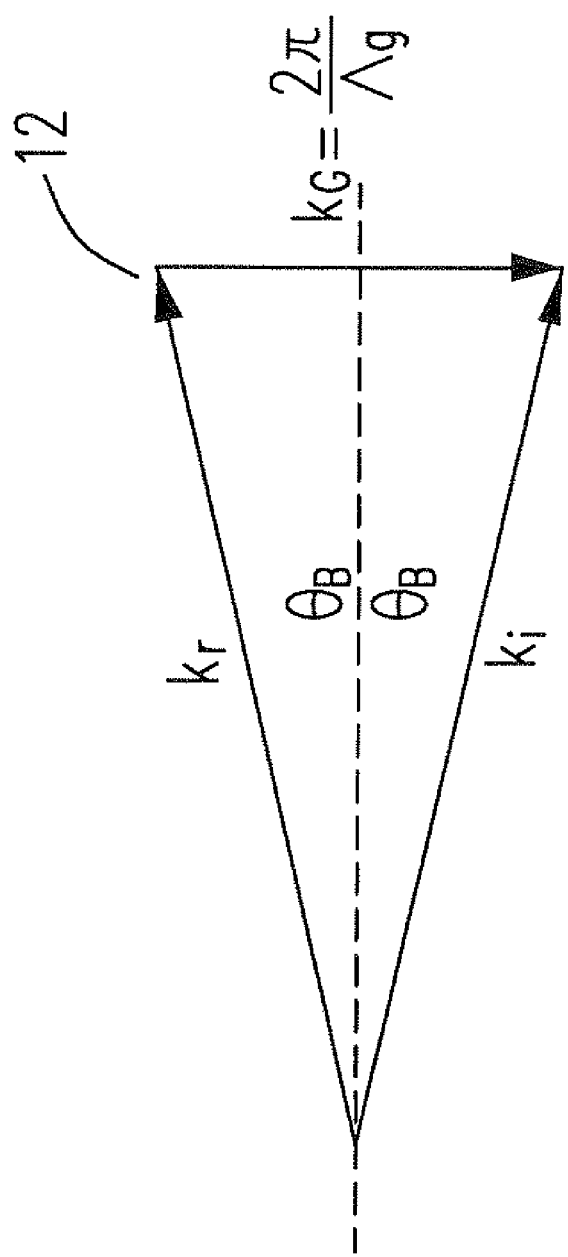

FIGS. 1(a)-1(b) depict a schematic diagram of a 1D EO Bragg deflector 11 and the wave-vector matching diagram 12 of the Bragg deflection or diffraction ($\theta_B$ is the Bragg angle, $k_G = 2\pi/\Lambda_g$ is the grating vector of a Bragg deflector, and $\Lambda_g$ is a spatial period of the refractive-index modulation in a Bragg grating); the apparatus generally comprises a voltage driver 13, an EO crystal with spatial modulation of the EO coefficient 14 with the sign of the EO coefficient denoted by ±, and a set of electrodes 15.

Although the set of electrodes 15 are exemplified with conducting layers on the top and bottom of the EO crystal 14, the location of the electrodes can be carefully designed according to the desired direction of the electric field to be applied to the crystal. The voltage driver 13 can supply a suitable voltage onto and an electric field into the EO crystal 14 to generate a spatially modulated refractive index or a grating in the EO crystal. When a light wave with a wave vector $k_i$ 16 is incident on the grating at the Bragg angle $\theta_B$, the light wave is coherently deflected away from the grating with a wave vector $k_r$ 17 according to the-wave-vector-matching diagram 12. This phenomenon is called the Bragg deflection or Bragg diffraction.

For example, the sign of the EO coefficients $r_{33}$ and $r_{13}$ changes periodically in a periodically poled lithium niobate (PPLN) crystal. When an electric field $E_z$ is applied along the crystallographic z direction of a PPLN crystal, the refractive-index change in the crystal domain is governed by the expression:

$$\Delta n_{o,e} = -\frac{n_{o,e}^3 r_{13,33} E_z s(x)}{2}, \qquad \text{Eq. (1)}$$

where $n_o$ and $n_e$ are the ordinary and extraordinary refractive indices without the applied electric field, respectively, $r_{33}$ and $r_{13}$ are the relevant Pockels coefficients for the ordinary and extraordinary incidence waves, respectively, and $s(x)=\pm 1$ denotes the sign of the crystal-domain orientation of the PPLN crystal as a periodic function of x. With the $E_z$ and thus the periodic refractive-index change, the PPLN crystal becomes a piece of optical grating. Without $E_z$, the PPLN crystal appears homogeneous in its refractive index to an incident light wave. Since the EO coefficient $r_{33}$ is much larger than $r_{13}$ for lithium niobate, the extraordinary wave is the preferred incidence wave for this EO PPLN grating. For what follows, we only consider an incidence light wave with extraordinary polarization. Refer to FIG. 1. A laser is coherently scattered in a grating when the incident and deflection angle (the Bragg angle), $\theta_B$, satisfies the Bragg diffraction/deflection condition, $\theta_{B,m} = \sin^{-1}[m\lambda_0/(2n\Lambda_g)]$, where m is an integer denoting the diffraction order, $\lambda_0$ is the light wavelength in vacuum and n is the average refractive index of the grating. Since diffractions with $m=\pm 1$ orders are usually most significant, in the following, we shall confine the discussion for Bragg diffractions with $m=\pm 1$. The Bragg scattering loss only occurs when the Bragg condition is matched. Without $E_z$, the PPLN crystal appears homogeneous in its refractive index to an incident light wave and the Bragg vector vanishes. In other words, without $E_z$, the Bragg condition is invalid for the incident light wave and no loss is introduced to the incident light. Bragg scattering is a different from the Rayleigh scattering loss which increases with the inverse of the fourth power of the wavelength but does not require Bragg vector matching. The Bragg angle $\theta_B$ is usually small in most applications, so the propagation directions of the incident and deflected light waves are nearly perpendicular to the grating vector of an EO Bragg deflector. The diffraction efficiency of an EO Bragg grating with a sinusoidal refractive-index variation can be derived by following a similar analysis for an AO Bragg cell, given by:

$$\eta = \frac{I_d}{I_{in}} = \sin^2\left(\frac{\gamma L}{2}\right), \qquad \text{Eq. (2)}$$

where $I_{in}$ and $I_d$ are the incidence and diffraction/deflection intensities of a laser, respectively, L is the length of the grating, and $\gamma = 4\pi\delta n/\lambda_0$ with $\delta n$ being the amplitude of the sinusoidal refractive-index variation in the grating. From Fourier decomposition, it is straightforward to show $\delta n = 2\Delta n/\pi$ for the first-order Fourier component of the square-wave index profile in an EO PPLN grating. The high-order Fourier components of the square-wave index modulation are only important for a very large $\Delta n$. The half-wave voltage of an EO Bragg deflector, $V_\pi$, is the voltage required for transferring all the incident laser power to the deflected laser power, which is equivalent to the voltage satisfying $\gamma L = \pi$ in Eq. (2). Therefore, the half-wave voltage of an EO PPLN Bragg deflector for an incident light wave with extraordinary polarization can be calculated from Eqs. (1, 2), given by:

$$V_\pi = \frac{\pi}{4}\frac{\lambda_0}{r_{33}n_e^3}\frac{d}{L}, \qquad \text{Eq. (3)}$$

where d is the separation distance of the two electrodes.

In addition to a PPLN crystal, a periodically poled Potassium Titanyl Phosphate (PPKTP) crystal or a periodically poled Lithium Tantalite (PPLT) crystal can also have a periodically altered refractive index when one applies a suitable electric field to the crystal. With the electric field, the periodically modulated refractive index in a PPKTP or a PPLT is also capable of inducing the Bragg scattering loss.

Figure 2B:
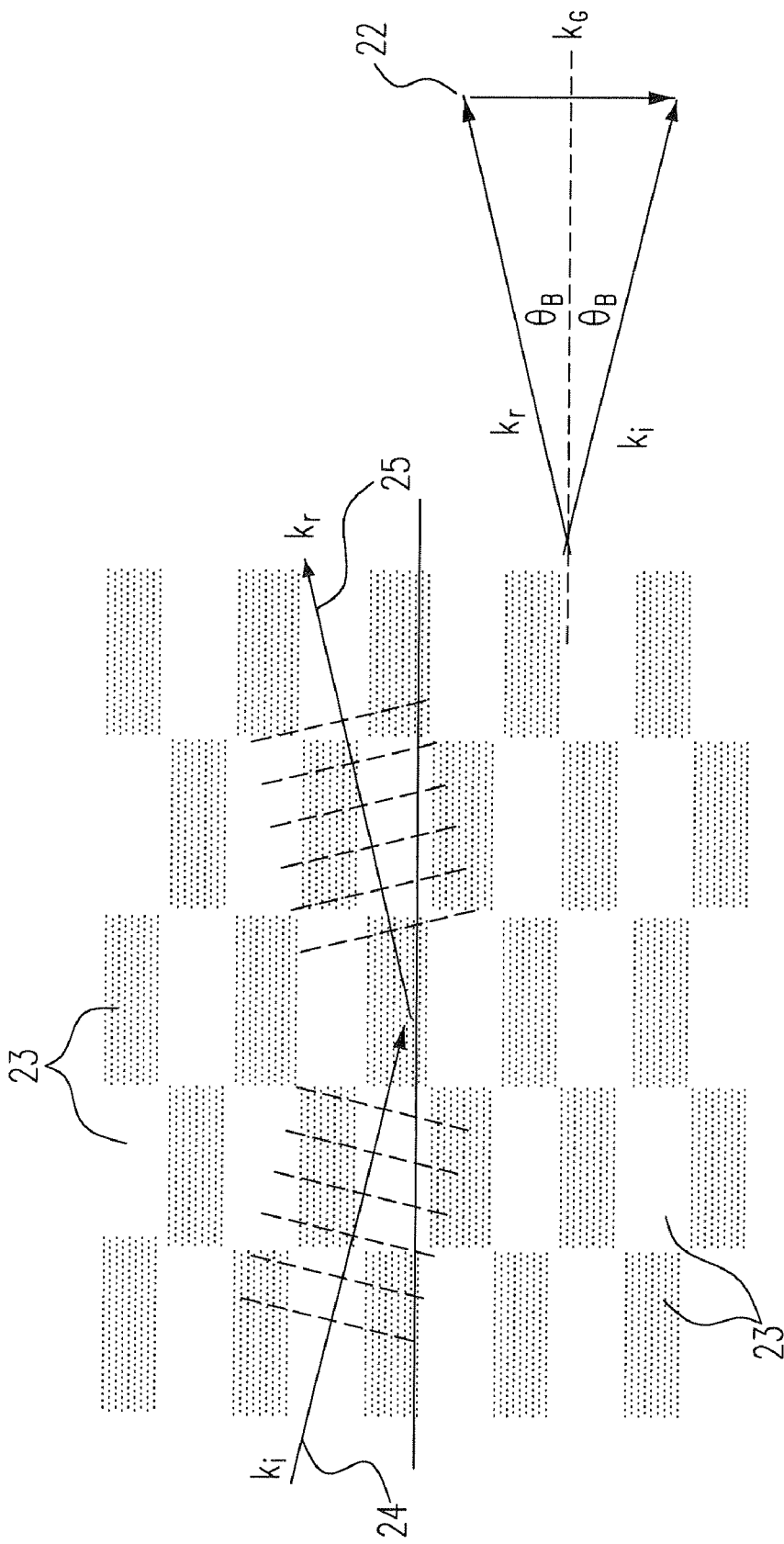
Figure 5A:
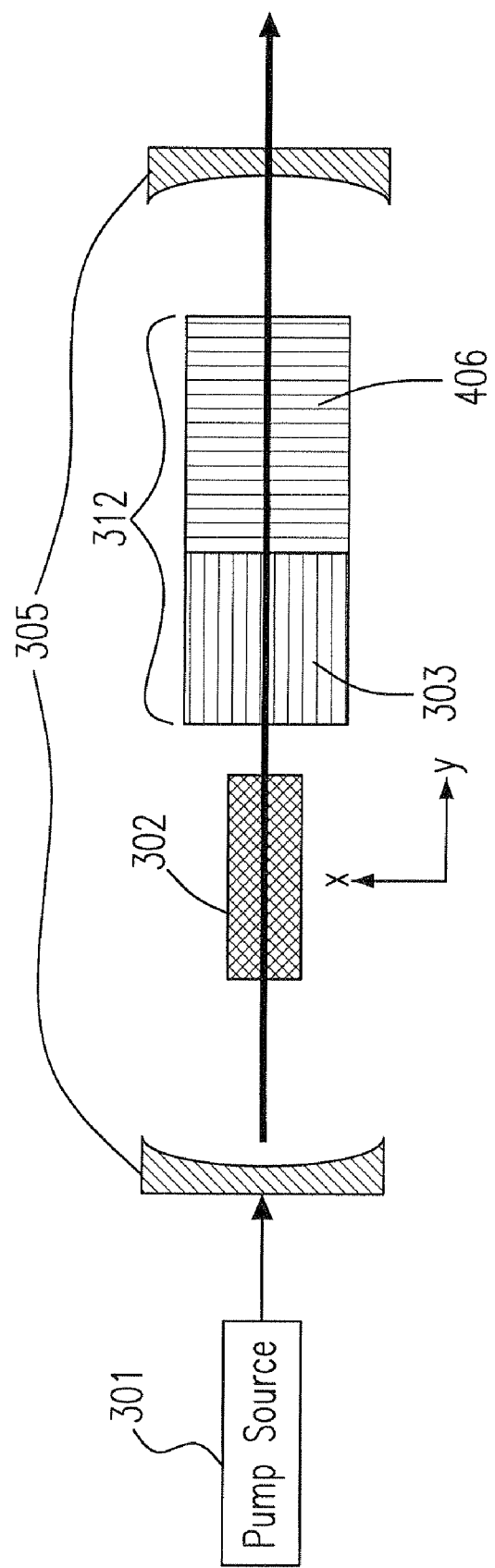
FIGS. 5(a)-5(d) depict the schematic diagrams of the first to the fourth preferred embodiments of the Q-switched wavelength-conversion laser system using a monolithically integrated EO Bragg deflector and QPM wavelength converter of the present invention.
Figure 5B:
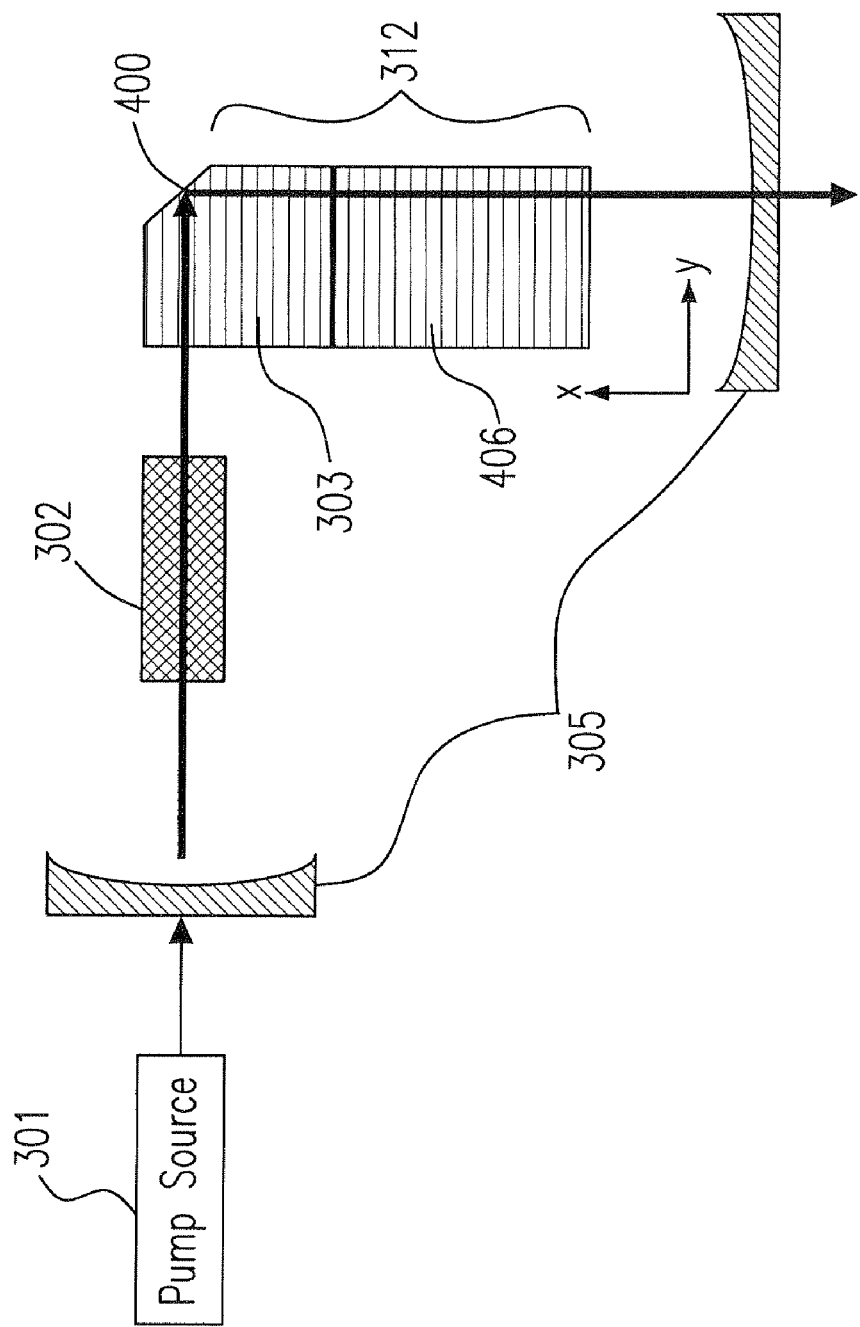
Figure 5C:
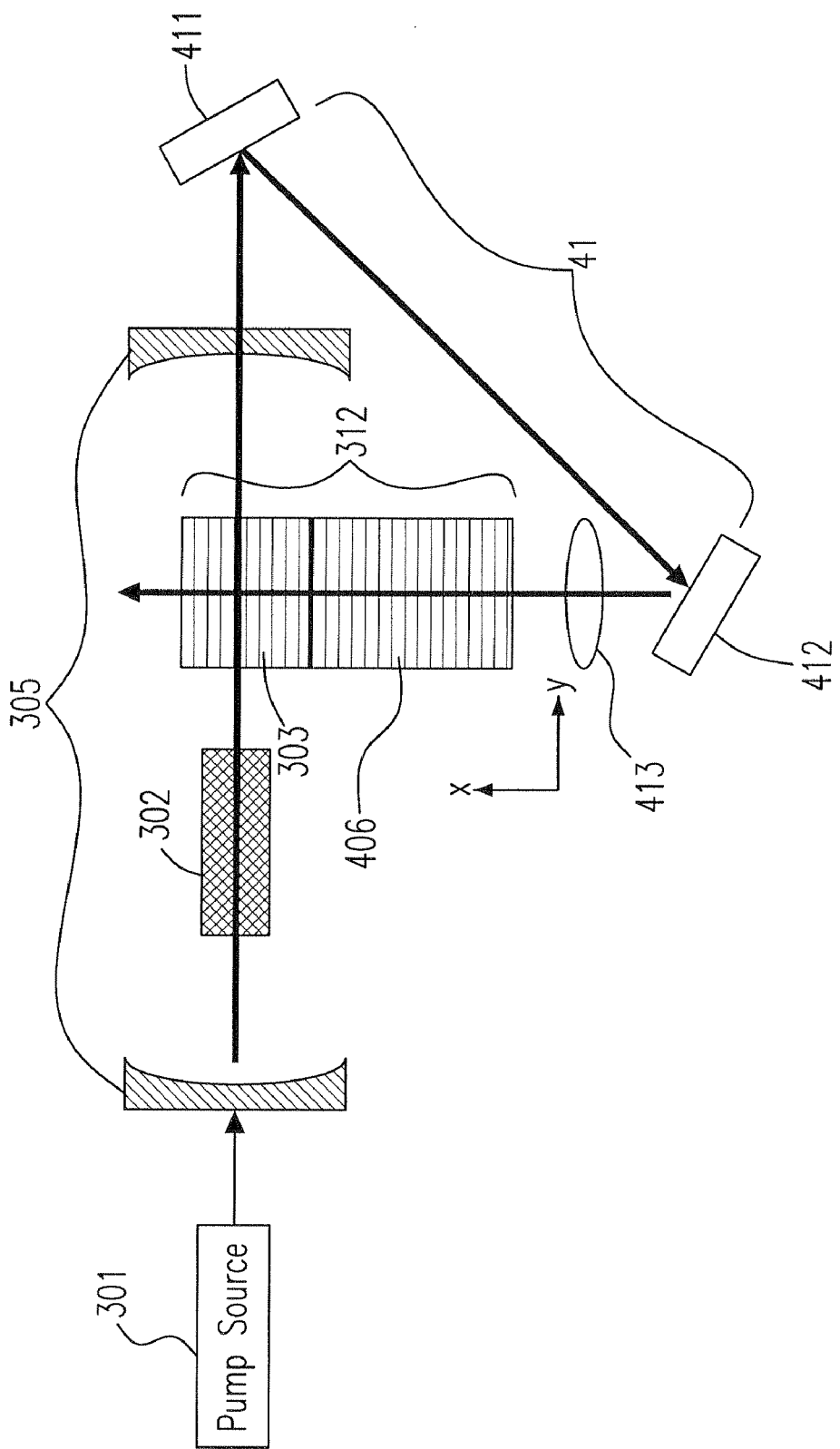
Figure 5D:
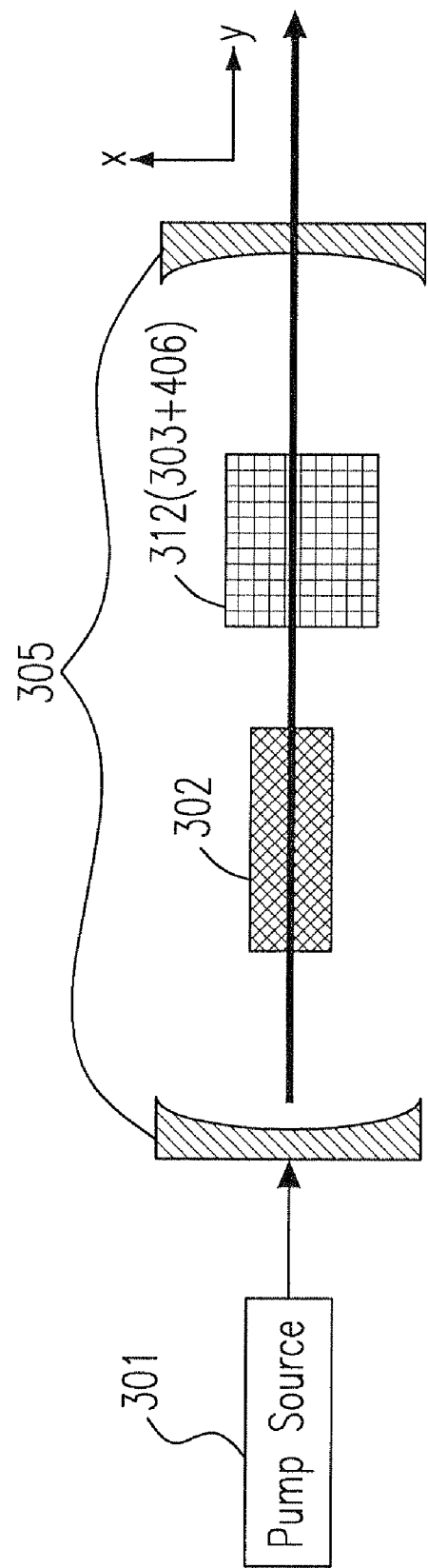

FIGS. 2(a)-2(b) depict a schematic diagram of a 2D EO Bragg deflector 21 and its wave-vector matching diagram 22 of the Bragg deflection or diffraction. Although the 2D spatial modulation of the EO coefficient is exemplified by a 2D periodical square array of EO material domains, it can be in general a 2D periodical array with any domain shape. For this 2D EO Bragg deflector, the grating vector $k_G$ is not a single value along a single direction, but can be any matched grating vector in the 2D reciprocal lattice of the 2D electro-optic domain pattern. Therefore, this embodiment of the present invention allows more probability of Bragg scattering from and into different angles. Again, the apparatus in general comprises a voltage driver 13, an EO crystal with 2D spatial modulation of the EO coefficient 23, and a set of electrodes 15. The set of electrodes 15 are fabricated on the EO crystal 23. The voltage driver 13 can supply a suitable voltage onto the electrodes and induce an electric field inside the EO crystal 23 to generate a spatially modulated refractive index or a grating in the EO crystal. When a light wave with a wave vector $k_i$ 24 is incident on the 2D grating satisfying the generalized Bragg wave-vector matching condition 22 $k_i - k_r - k_G = 0$ for the 2D Bragg deflector, the light wave is coherently deflected away from the grating with a wave vector $k_r$ 25. This phenomenon is called 2D Bragg deflection or Bragg diffraction. One additional advantage associated with the preferred embodiment of the present invention in FIG. 2 is the ease of integrating the functions of a Bragg deflector and a QPM wavelength converter in a single design of the 2D array, if the material of the EO Bragg deflector is also a QPM material. For instance, lithium niobate and lithium tantalate belong to this class of materials. As a design example, one can specify the longitudinal grating vector along the incident laser direction to satisfy the QPM condition for nonlinear laser wavelength conversion, while allowing the transverse grating vector of the 2D array to perform the primary Bragg scattering when a voltage is applied to the crystal. This particular advantage is schematically shown in FIG. 5(d) below.

Figure 3:
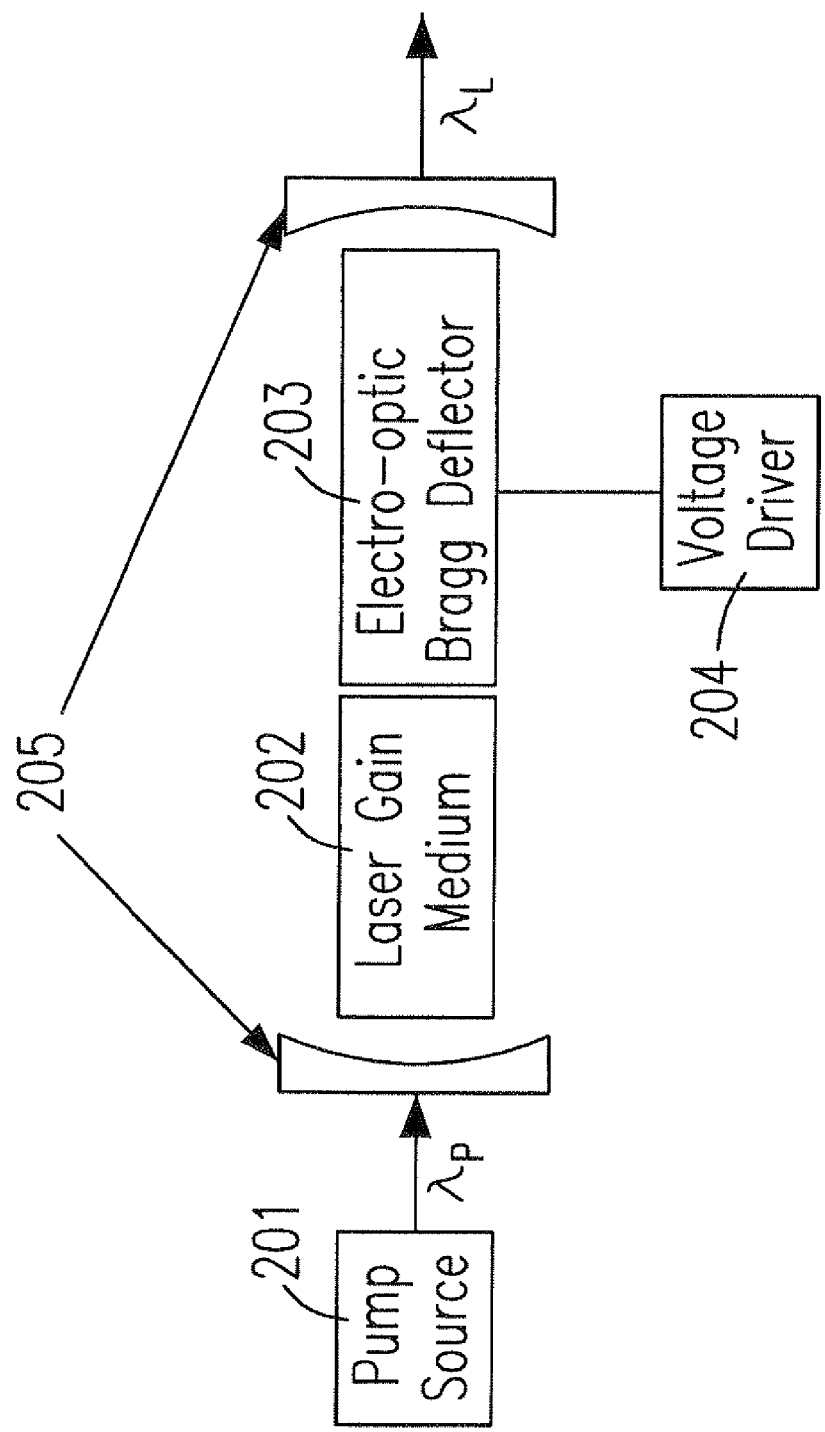
FIG. 3 depicts the schematic diagram of an actively Q-switched laser system utilizing the EO Bragg deflector of the present invention as a laser Q-switch according to a third preferred embodiment of the present invention.

In FIG. 3, the actively Q-switched laser system according to the second preferred embodiment comprises a pump source 21, a laser gain medium 22, an EO Bragg deflector 23, a voltage driver 24, and a laser cavity 25. The pump source 21 provides pump radiation at $\lambda_p$ within the absorption spectrum of the laser gain medium. The laser gain medium 22 absorbs the pump radiation at $\lambda_p$, and generates laser radiation at wavelengths $\lambda_L$ in the laser cavity. When the voltage driver 24 supplies a voltage to the EO Bragg deflector 23, the light signal at $\lambda_L$ is misaligned in the laser cavity 25 due to the Bragg diffraction/deflection and the laser cavity can not support laser operation in such a low-Q or high-loss cavity. However the pump energy is continuously stored to the upper energy level of the laser gain medium 22 during the low-Q cavity state. When no voltage is supplied to the EO Bragg deflector 23, the refractive index is uniform in the EO Bragg deflector 23 and the light signal at $\lambda_L$ is well aligned in the laser cavity 25 for laser emission; this corresponds to the high-Q or low-loss state of the laser cavity 25. As a consequence, effective laser Q-switching can be accomplished by properly modulating the voltage supplied from the voltage driver 24 to the EO Bragg deflector 23 via the electrodes 15. In practice, the Q-switching voltage can be less than the half-wave voltage, as long as there is enough contrast between the high and low-Q states for the laser. The laser gain medium 22, such as an Nd-doped laser crystal, can sometimes provide one or several emission wavelengths. The EO Bragg Q-switch of the present invention 23 can also operate at multiple wavelengths simultaneously.

Figure 4A:
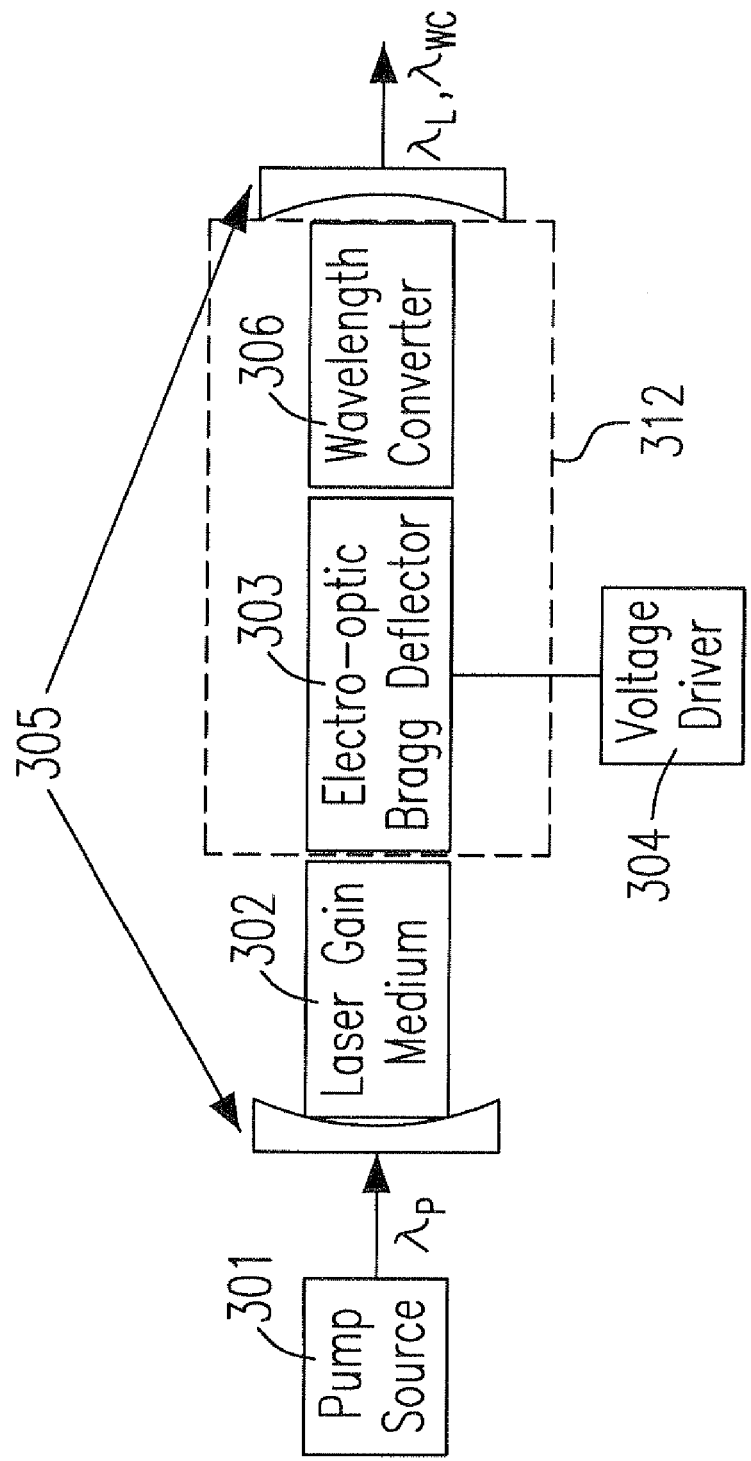
FIGS. 4(a)-4(f) depict the schematic diagrams of actively Q-switched wavelength-conversion and/or wavelength-tunable laser systems according to a fourth preferred embodiment of the present invention.
Figure 4B:
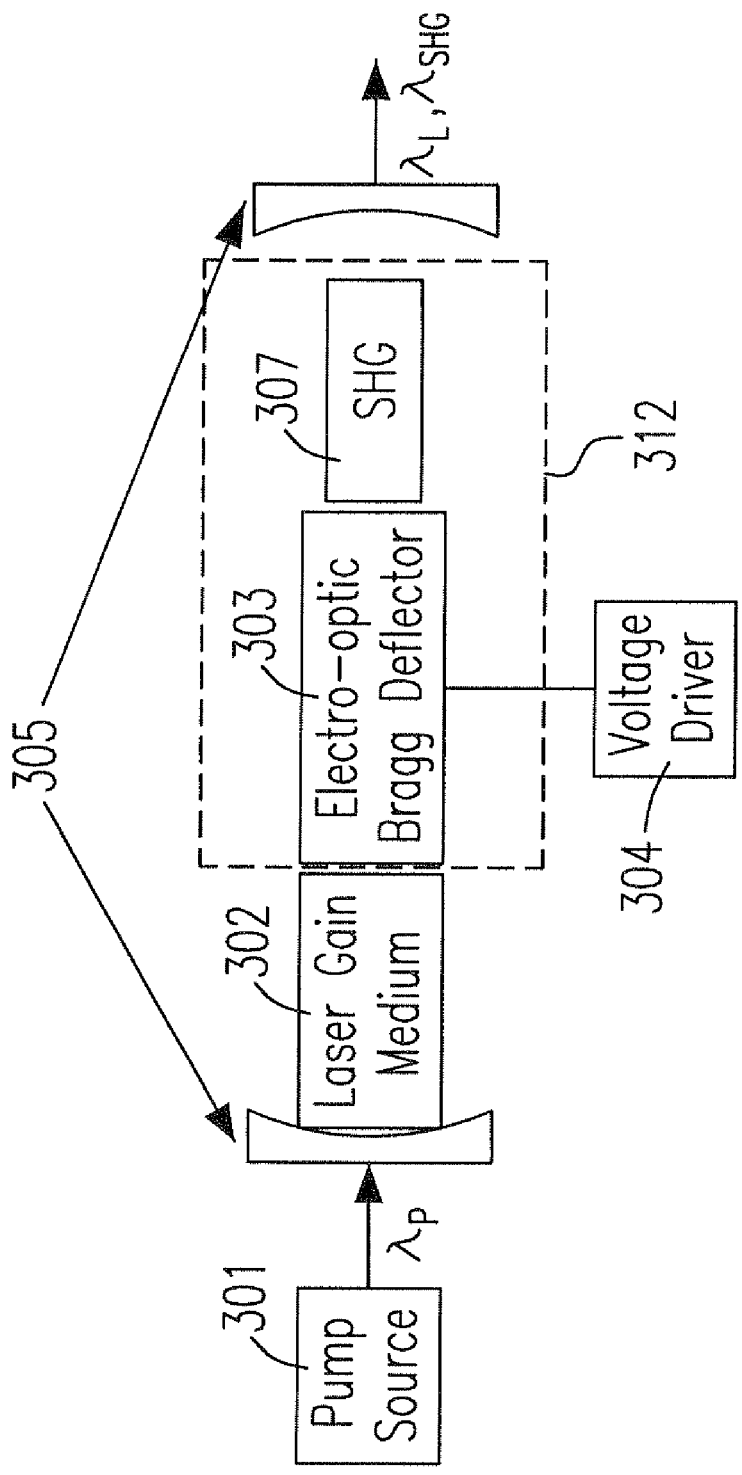
Figure 4C:
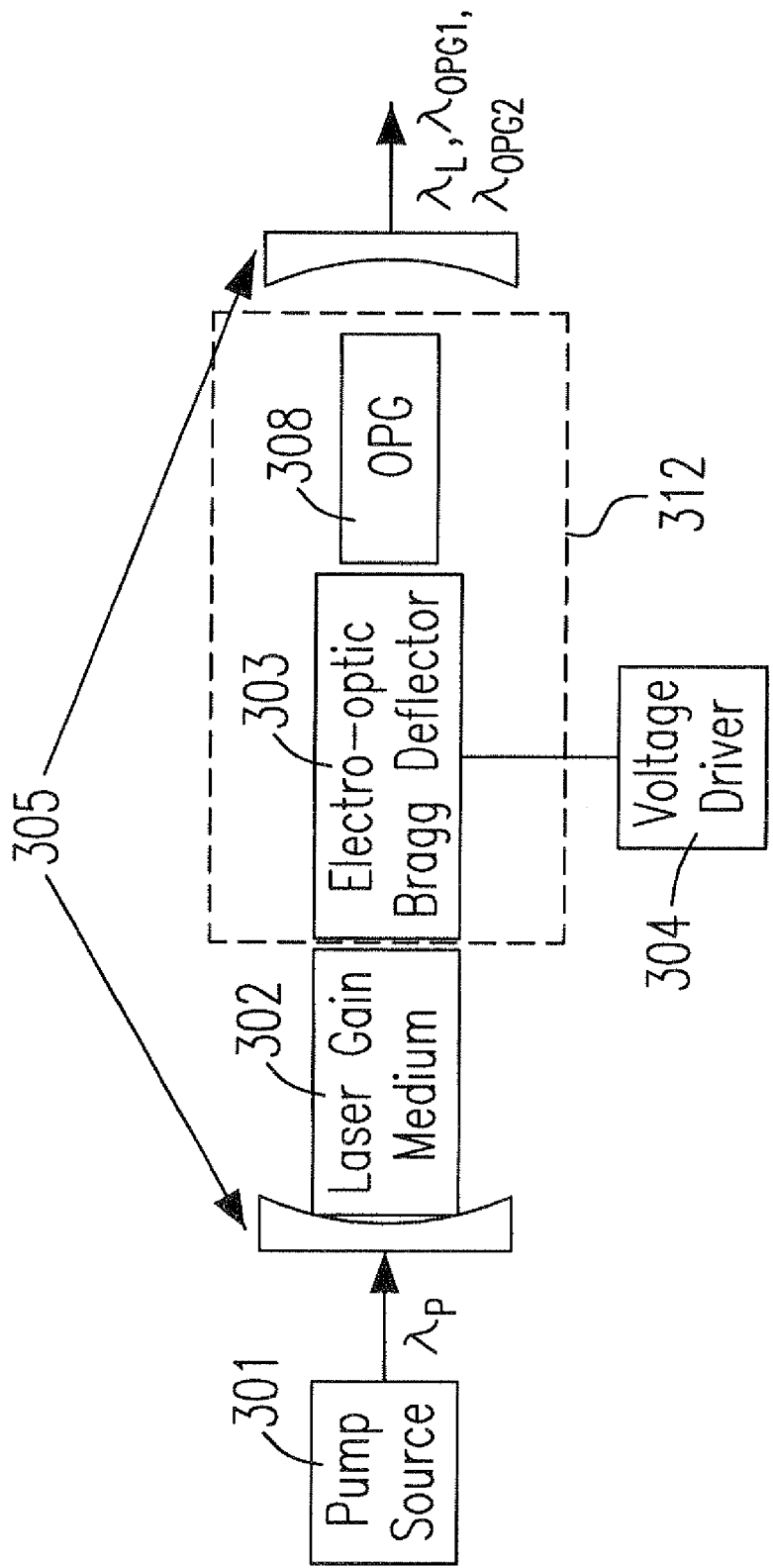
Figure 4D:
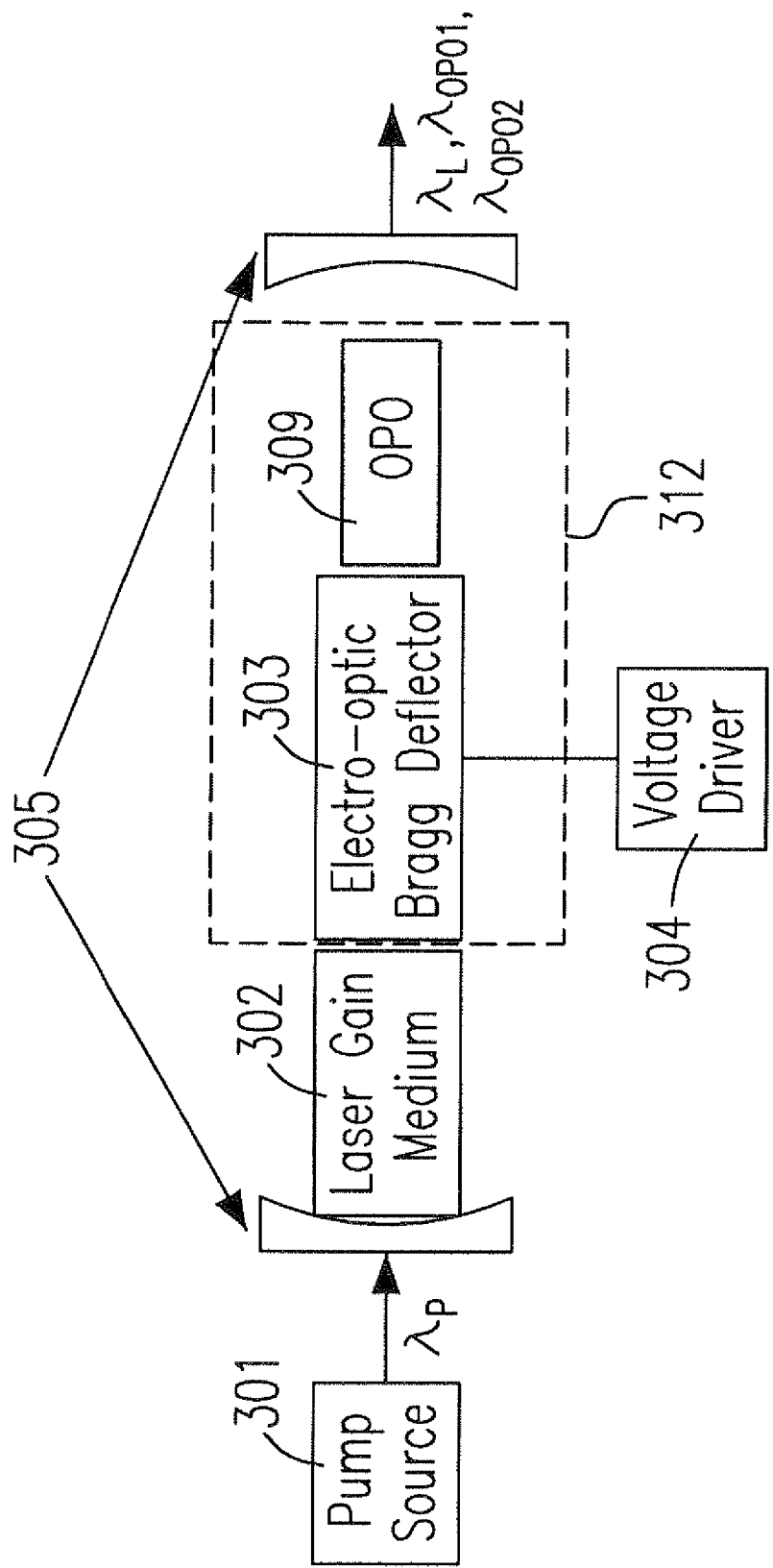
Figure 4E:
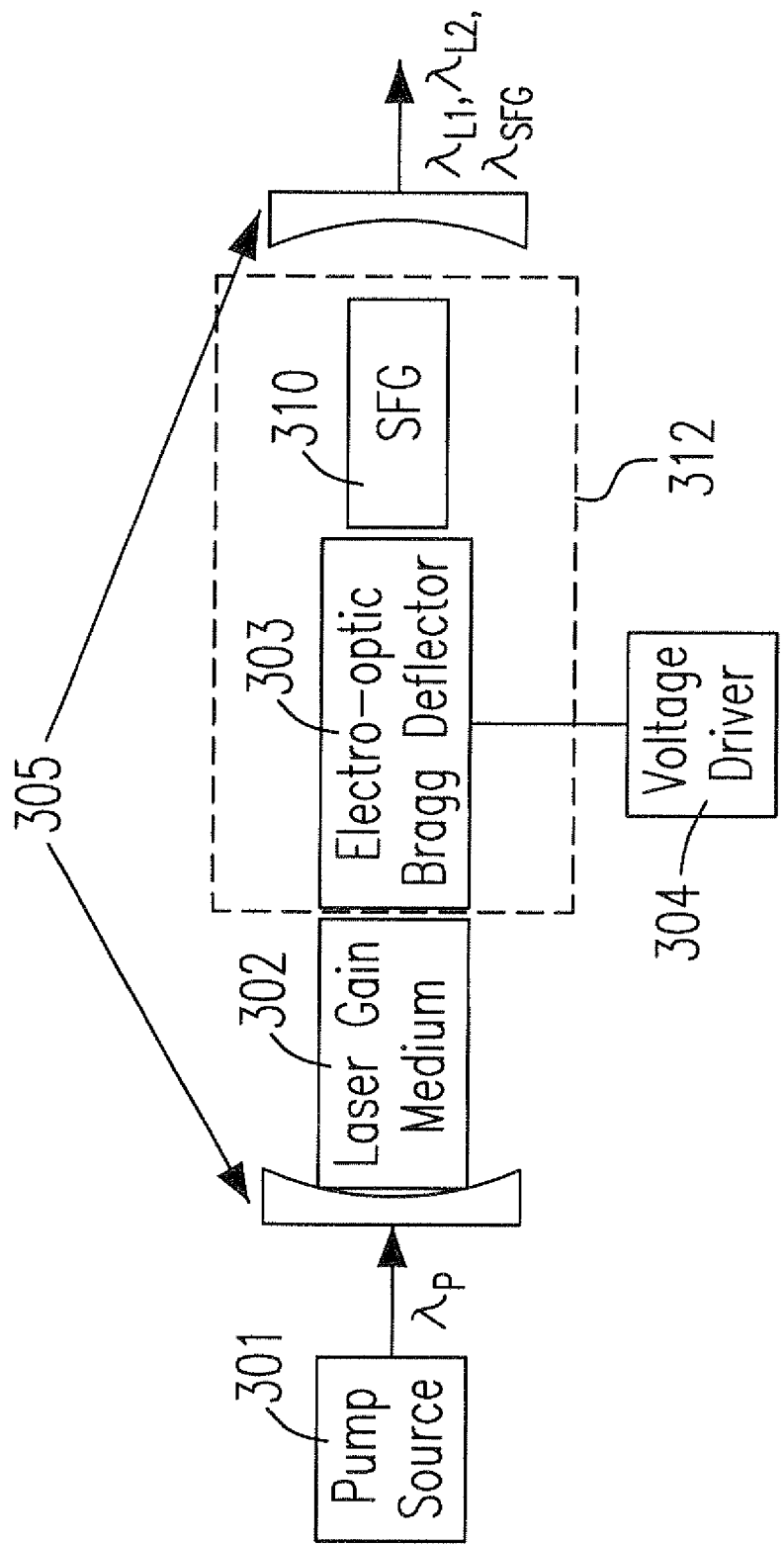
Figure 4F:
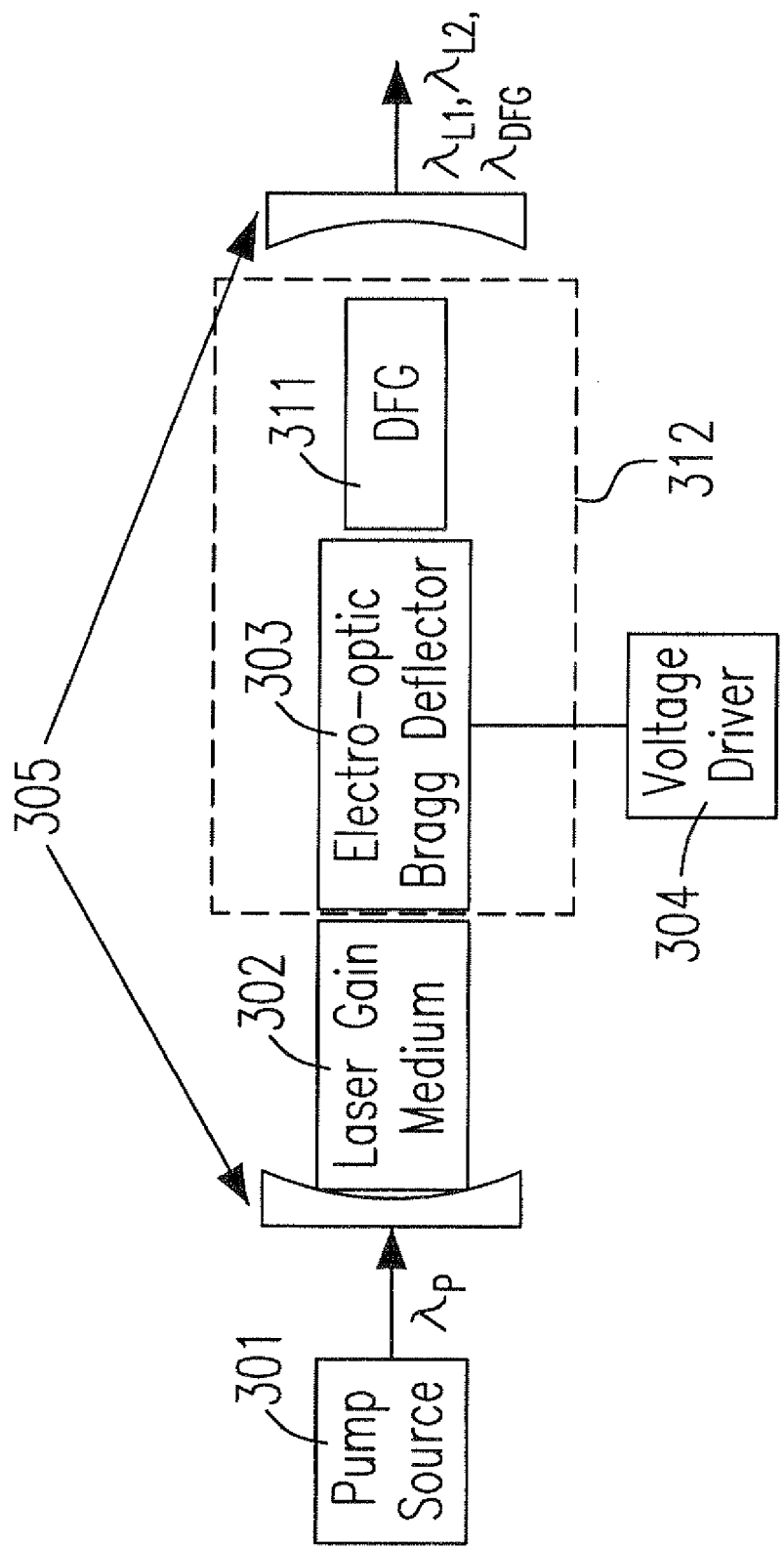

FIGS. 4(a)-4(f) show the schematic diagrams of the actively Q-switched wavelength-conversion and/or wavelength-tunable laser systems according to the third preferred embodiment of the present invention. This laser system comprises an optical pump source 301, a laser gain medium 302, an EO Bragg deflector 303, a voltage driver 304, a laser cavity 305, and a laser wavelength converter 306. The optical pump source 301, the laser gain medium 302, the EO Bragg deflector 303, the voltage driver 304, and the laser cavity 305 work together to generate high-power, Q-switched laser radiation at $\lambda_L$ according to the second preferred embodiment of the present invention. The wavelength converter 306 converts the wavelength of the high-power laser radiation $\lambda_L$ to a different one $\lambda_{WC}$ (The nondepleted pump at $\lambda_L$ and the wavelength-converted laser at $\lambda_{WC}$ are shown at the outputs of FIG. 4(a)); hence, the radiation wavelength of a laser is no longer limited by the quantum energy levels in a laser gain medium 302. Taking the $\chi^{(2)}$-based wavelength converter as an example, the wavelength converter 306 can be one or several selected from a group consisting of a SHG 307 (output wavelengths $\lambda_L$ and $\lambda_{SHG}$ with $\lambda_L/2=\lambda_{SHG}$ as shown in FIG. 4(b)), an OPG 308 (output wavelengths $\lambda_L$, $\lambda_{OPG1}$ and $\lambda_{OPG2}$ with $1/\lambda_L=1/\lambda_{OPG1}+\lambda_{OPG2}$ as shown in FIG. 4(c)), an OPO 309 (output wavelengths $\lambda_L$, $\lambda_{OPO1}$ and $\lambda_{OPO2}$ with $1/\lambda_L=1/\lambda_{OPO1}+\lambda_{OPO2}$ as shown in FIG. 4(d)), a SFG 310 (output wavelengths $\lambda_{L1}$, $\lambda_{L2}$ and $\lambda_{SFG}$ with $\lambda_{L1}+\lambda_{L2}=\lambda_{SFG}$ as shown in FIG. 4(e)), and a DFG 311 (output wavelength $\lambda_{L1}$, $\lambda_{L2}$ and $\lambda_{DFG}$ with $1/\lambda_{L1}-1/\lambda_{L2}=1/\lambda_{DFG}$ as shown in FIG. 4(f)). For the SFG and DFG, the two wavelength components at $\lambda_{L1}$ and $\lambda_{L2}$ can be both emitted from a single laser gain medium 302 or either of them can be injected from a separate laser source.

Although the EO Bragg deflector 303 and the wavelength converter 306 can be implemented separately for a laser system, a significant feature of the present invention is the ease of the integration of the EO Bragg deflector 303 and the wavelength converter 306 in a monolithic nonlinear-optical crystal substrate. For example, the EO Bragg deflector 303 can be implemented from one selected from a group consisting of a PPLN crystal, a periodically poled Potassium Titanyl Phosphate (PPKTP) crystal, a periodically poled Lithium Tantalite (PPLT) crystal; whereas the wavelength converter 306 can be implemented from one selected from a group consisting of a KTP crystal, a Beta Barium Borate (BBO) crystal, a Lithium Triborate (LBO) crystal, a PPLN crystal, a PPKTP crystal, a PPLT crystal etc. When the material of the EO Bragg deflector 303 and that of the wavelength converter 306 are the same, the EO Bragg deflector 303 and the wavelength converter 306 can be easily fabricated on a single crystal substrate. In particular, an EO Bragg deflector can be cascaded to a QPM wavelength converter in a fabrication process, because both the EO Bragg deflector and the QPM wavelength converter have a material structure containing spatial modulation of the nonlinear coefficient. FIG. 5(a) shows a first preferred embodiment of the integrated EO Bragg deflector and QPM wavelength converter 312 for a Q-switched wavelength-conversion laser according to FIG. 4(a), in which both the EO Bragg deflector 303 and the QPM wavelength converter 406 are fabricated on a monolithic nonlinear-optical crystal with their grating vectors perpendicular to each other. The period of the QPM grating is determined by the wavelengths to be generated and the wavelength-conversion process to be carried out in the laser. FIG. 5(b) shows a second preferred embodiment of the integrated EO Bragg deflector and QPM wavelength converter 312 in a Q-switched wavelength-conversion laser according to FIG. 4(a), in which the Bragg grating vector of the EO Bragg deflector 303 and the QPM grating vector of the QPM wavelength converter 406 are aligned in the same direction but the resonant laser beam is bent toward the direction of the QPM grating vector via a 90-degree total internal reflection 400. FIG. 5(c) is a third preferred embodiment of the integrated EO Bragg deflector and wavelength converter 312, in which the output beam of the Q-switched laser, according to FIG. 3, is deflected back and focused into the monolithically integrated QPM wavelength converter 406 by a set of properly arranged reflection mirrors and lenses 41 (e.g., which includes two high-reflection mirrors 411-412, and a focusing lens 413). FIG. 5(d) is a fourth preferred embodiment of the integrated 2D EO Bragg deflector and wavelength converter 312 (303+406 as a whole), which can satisfy Bragg condition and phase-matching condition of nonlinear frequency mixing simultaneously.

Experimental Examples of the Invention

Figure 6:
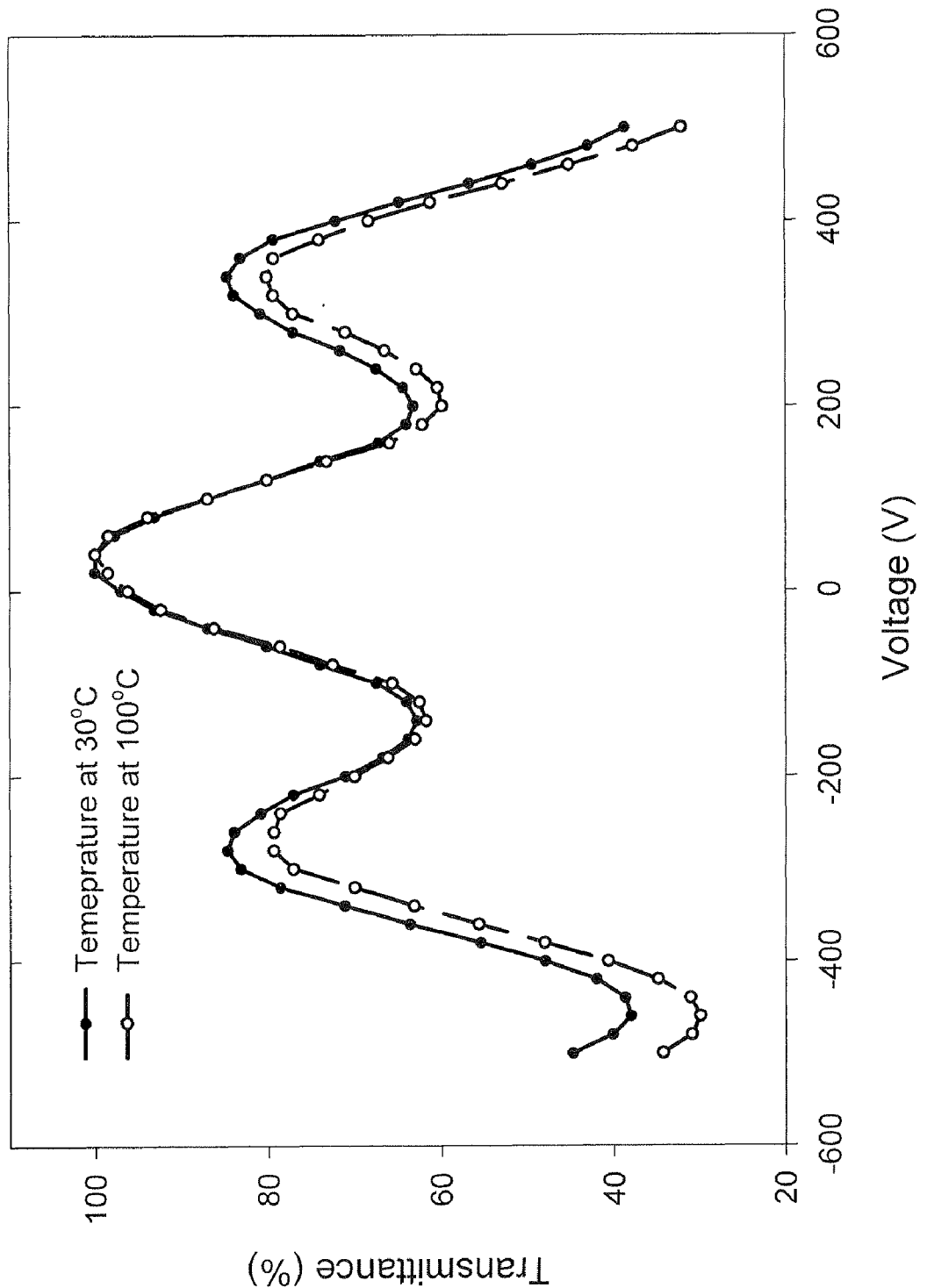
FIG. 6 depicts measured transmittance of a continuous-wave (CW) 1064-nm laser through the EO Bragg deflector at the zero-order direction as a function of the applied voltage, where the filled and open dots are data measured at 30° C. and 100° C., respectively.

According to the first preferred embodiment of the present invention, we fabricated a 1.42-cm-long, 1-cm-wide, and 780-μm-thick PPLN crystal as an EO Bragg deflector. The grating period of the EO PPLN Bragg deflector was 20.13 μm, corresponding to a Bragg angle of 0.7° for the first-order diffraction beam at 1064 nm. The ±z surfaces of the PPLN crystal were coated with 500-nm thick NiCr electrodes and the ±y surfaces were anti-reflection coated at 1064 nm We first measured the diffraction efficiency of the PPLN crystal by using a continuous-wave laser at 1064 nm with 110-μm laser radius. The incident angle of the laser was pre-aligned to the Bragg angle. FIG. 6 shows the measured transmittance of the zero-order diffraction beam versus applied voltage at 30° C. and 100° C. It is seen from the curves that the diffraction loss of this EO Bragg deflector is fairly insensitive to temperature. The slight offset of the transmittance peak from the zero voltage is due to the stress-induced refractive index change at the PPLN domain boundaries. In the measurement, we used a fairly small laser radius to simulate the small mode size in the Q-switched laser cavity below. The broad angular spectrum of the incidence laser prevented us from obtaining 100% diffraction efficiency at $\gamma L=\pm\pi$ predicted by the plane-wave model Eq. (2). However, when we used a more collimated, large-size incidence beam, the measured diffraction efficiency can indeed approach 100%. For the Q-switched laser according to the second preferable embodiment of the present invention, it is not necessary to have 100% diffraction loss for holding the Q-switched laser from lasing at the low-Q state. In FIG. 6, the diffraction loss is increased at a high voltage, because high-order scatterings from the square-wave grating are more significant when Δn becomes large under a large applied voltage. From FIG. 6, the measured half-wave voltage is about 160 V, which gives a normalized half-wave voltage of 0.29 V×d (μm)/L(cm). From Eq. (3), the calculated half-wave voltage is 151 V with $r_{33}$=30.3 pm/V, and $n_e$=2.156 at 1064 nm for lithium niobate. The somewhat higher value of the measured half-wave voltage is attributable to the intrinsic difficulty in fabricating an exact 50% domain duty cycle PPLN crystal. For example, a 10% deviation from the ideal 50% duty cycle of the periodically poled structure can already account for the 9-volt increased half-wave voltage.

Figure 7:
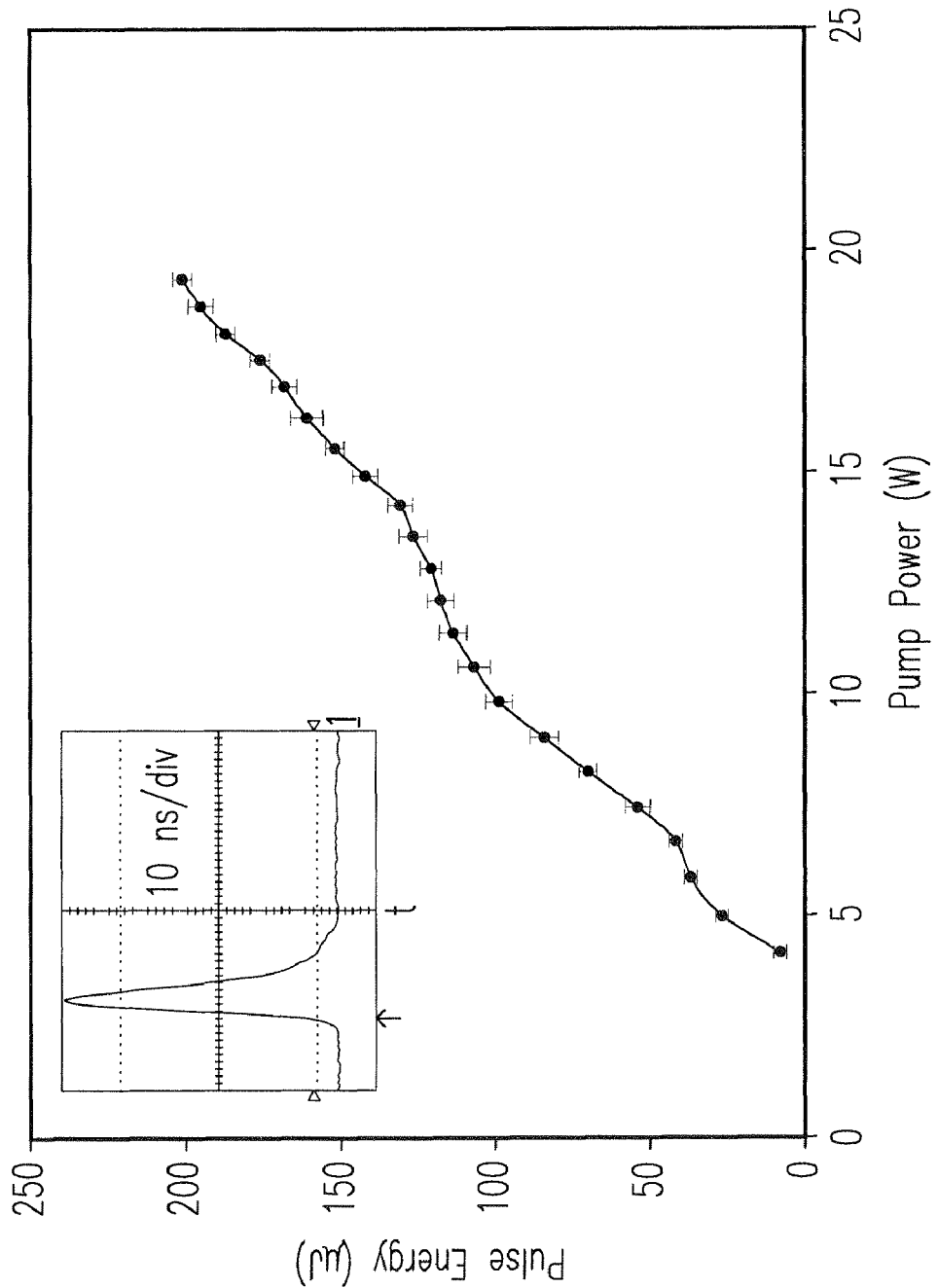
FIG. 7 is the output pulse energy of an actively Q-switched Nd:YVO$_4$ laser versus diode-laser pump power using the EO Bragg deflector as a laser Q-switch, where, with 19.35-W pump power at 808 nm, the laser produces 201-µJ energy or 26-kW peak power in a pulse width of 7.8 ns (laser pulse shown in the inset)

According to the second preferred embodiment of the present invention shown in FIG. 3, we installed the EO PPLN Bragg deflector into a Nd:YVO$_4$ laser. The pump source is a 20-W diode laser at 808 nm. The laser gain medium is a 9-mm-long, a-cut 0.25-at. % Nd-doped YVO$_4$ crystal with its end surfaces coated with anti-reflection layers at both 1064 and 808 nm wavelengths. The side surfaces of the Nd:YVO$_4$ crystal was wrapped in an indium foil and mounted in a water-cooled copper housing to dissipate the excess heat during pumping. In this example, the output coupler has a transmittance of 70% at 1064 nm During operation, we first biased the EO PPLN Bragg deflector with a −140 V DC voltage and drove the EO PPLN Bragg deflector with +140-V, 300-ns voltage pulses at 10 kHz. FIG. 7 shows the measured Q-switched pulse energy versus the diode pump power. At 19.35-W pump power, the Q-switched laser generates 201-p pulse energy with a 7.8-ns pulse width, corresponding to a peak power of 26 kW. The error bar in the plot shows that the pulse-to-pulse energy jitter is less than 5% over the range of our measurement. The inset of FIG. 7 shows the temporal profile of the Q-switched output pulse.

Figure 8A:
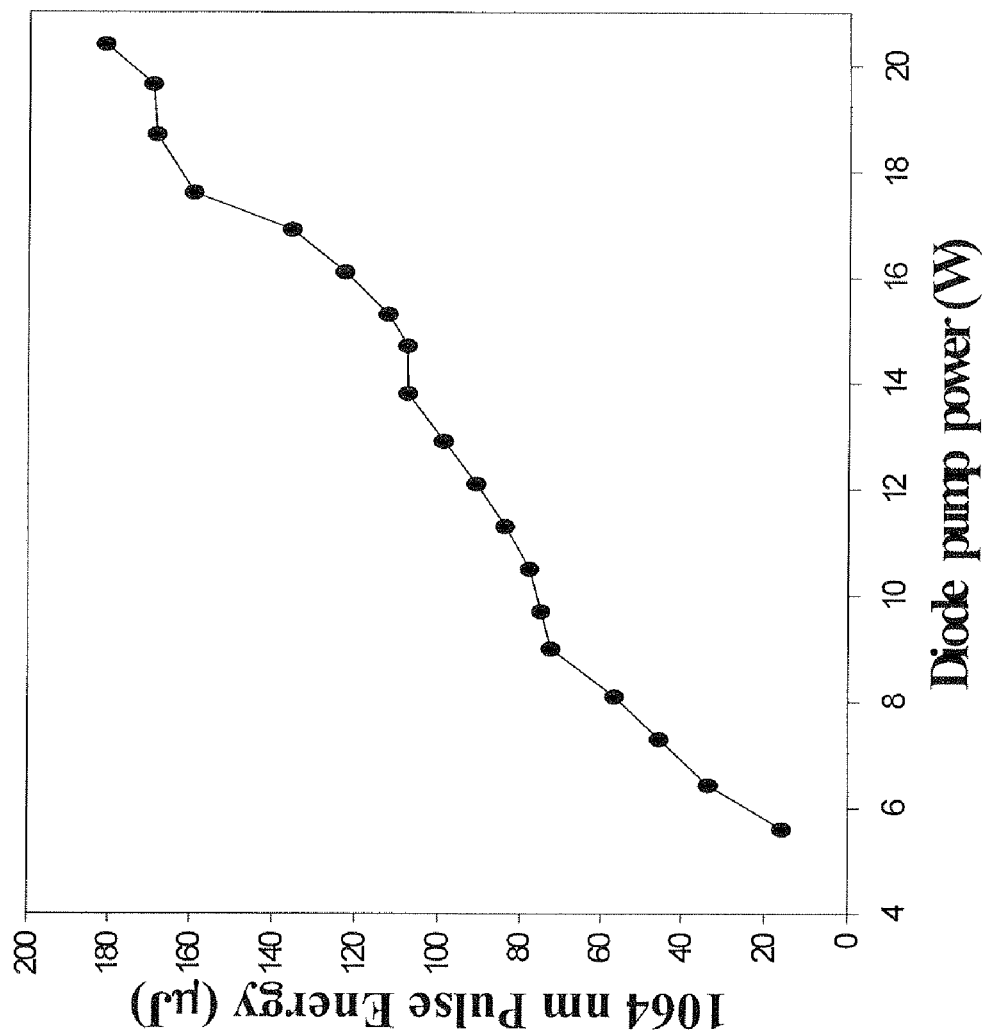
FIGS. 8(a) and 8(b) show, according to the Q-switched wavelength-conversion laser in FIG. 5(c), the output pulse energy of the actively Q-switched Nd:YVO$_4$ laser versus the diode pump power at a 1 kHz Q-switching rate, and the OPG signal energy versus the 1064-nm pump energy at a 1 kHz Q-switching rate, respectively.
Figure 8B:
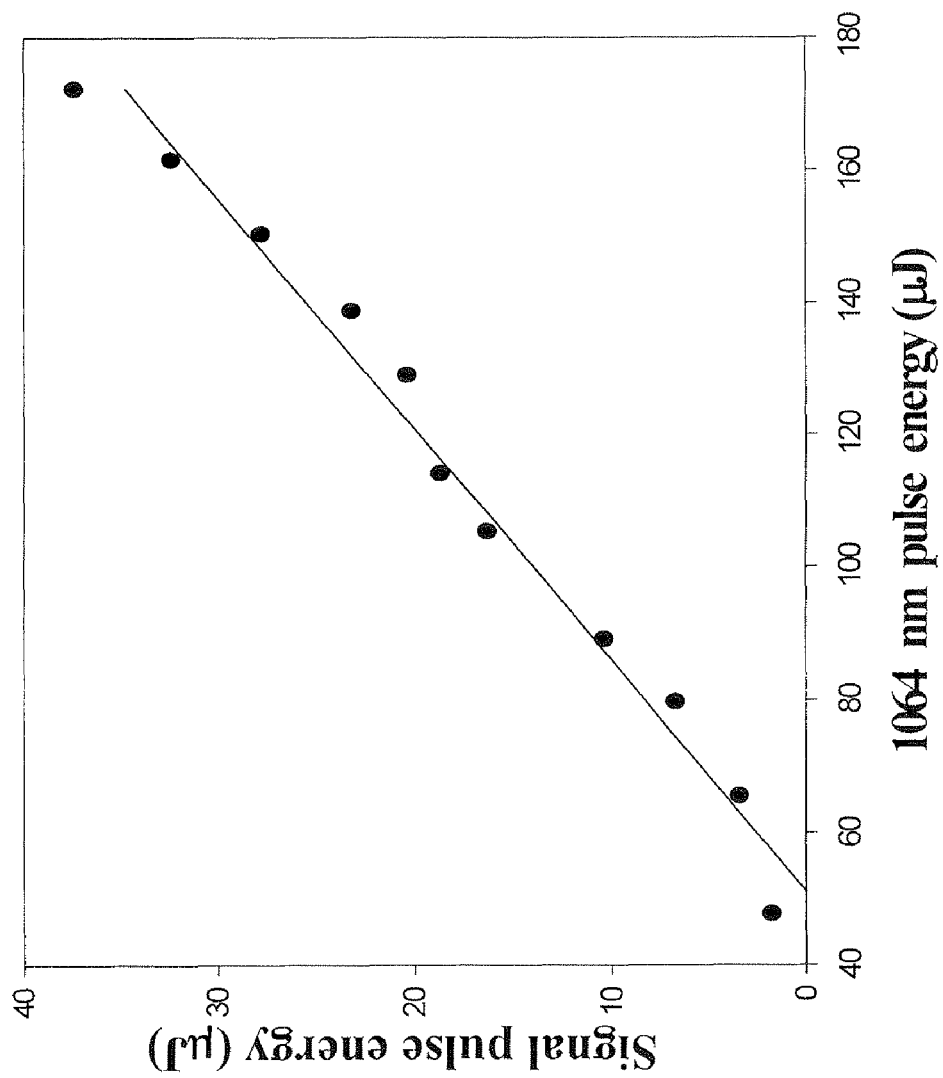

According to the Q-switched wavelength-conversion laser in FIGS. 4(a) and 4(c), we further fabricated a PPLN crystal and installed it into the Nd:YVO4 laser according to FIG. 5(c). The monolithic PPLN crystal used in this Q-switched OPG laser consists of two sections of different periods along the crystallographic x direction. The transverse width along y direction is 1.7 cm and the thickness along z direction is 0.78 mm Both the grating vectors of the two PPLN sections are in the x direction. The first PPLN has a length of 1 cm in x and a grating period of 20.3 μm, functioning as a laser Q-switch in the y direction. The second PPLN has a length of 3 cm in x and a grating period of 31 μm, functioning as an OPG in the x direction. During operation, we first set the temperature of the crystal oven to room temperature and applied a −170V DC bias voltage to the EO PPLN Bragg deflector. To Q-switch the laser, we superimposed a +170 V voltage pulse with a 500 ns pulse width and a 1-kHz pulse rate to the EO Bragg deflector. When the laser incidence angle was matched to the Bragg condition of the EO PPLN Bragg deflector, the laser started to generate Q-switched pulses. We used a double-convex lens with a 75-mm focal length (f=75 mm) after the output coupler to collimate the 1064-nm output pulses and two 1064-nm high-reflecting mirrors to direct the 1064-nm beam into the same PPLN crystal in the x direction. Another f=75-mm double-convex lens was used to focus the 1064-nm laser beam down to 80 μm laser waist radius at the center of the OPG PPLN. FIG. 8(a) shows the measured output energy of the 1064 nm pulse versus diode pump power when the PPLN Bragg Q-switch was operated at 1 kHz and kept at room temperature. After overcoming the pump threshold at about 5.5 W, the Q-switched 1064-nm laser generates pulse energy that steadily increases to 180 μJ/pulse at 20.4-W diode power. The peak output power at 1064 nm was 22.5 kW with a laser pulse length of 8 ns. The laser pulse energy was reduced about 15% when we increased the Q-switching rate to 10 kHz. The relatively short upper state lifetime of a Nd:YVO4 laser would allow the Q-switched Nd:YVO4 laser to operate at a pulse rate up to 50-100 kHz with high efficiency. However, high peak power at 1064 nm is desirable for pumping the OPG. For this example, we chose to operate the Nd:YVO4 laser at 1 kHz and used the maximum pulse energy of 180 μJ/pulse to pump the down-stream OPG. Due to losses in the optical components between the 1064-nm output coupler and the OPG, the 180 μJ pulse energy was slightly reduced to 172 μJ at the entrance of the OPG. We also raised the temperature of the PPLN crystal from room temperature to 200 and found no degradation in the output pulse energy shown in FIG. 8(a). The 31-μm period of the OPG PPLN crystal is phase matched to a signal wavelength of 1753 nm and an idler wavelength of 2707 nm for a pump wavelength of 1064 nm at 100. FIG. 8(b) shows the 1753-nm signal pulse energy versus 1064-nm pump energy with 28.7% slope efficiency. The maximum signal pulse energy reached 37.4 μJ with 172-μJ pump energy at 1064 nm The overall parametric efficiency from the 1064-nm pump to the signal and idler is 36%.

The distinct characteristics of the EO Bragg deflector and the actively Q-switched laser system according to the present invention have become clear from the descriptions of the preferred embodiments hereinbefore, which are summarized as follows:

1. Compared with a conventional EO laser Q-switch in the prior art, an EO Bragg deflector as a laser Q-switch utilizes a much lower switching voltage.

2. Both the EO Bragg Q-switch and the nonlinear wavelength converter can adopt a same $\chi^{(2)}$ nonlinear optical material, so that the laser Q-switch and the wavelength converter can be integrated into a monolithic material substrate. In particular, cascading an EO Bragg deflector to a QPM nonlinear wavelength converter of the same material is straightforward and compatible in a fabrication process.

3. The monolithic integration of the EO Bragg deflector and the QPM wavelength converter enables multi-functionalities to a laser source in a compact and efficient fashion.

4. Another unique feature of the present invention is the insensitivity of the Q-switch function to temperature variation in the monolithically integrated QPM wavelength converter, if laser wavelength tuning is desired by varying the temperature of the QPM wavelength converter.

While the present invention has been described in terms of what are presently considered to be the most practical and preferred embodiments, it is to be understood that the present invention need not be restricted to the disclosed embodiments. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An electro-optic (EO) Bragg deflector, comprising:
   an EO crystal with one of a 1D and a 2D spatially modulated EO coefficients, having an ordinary refractive index, an extraordinary refractive index and a refractive-index change, $\Delta n_{o,e}$, governed by an expression: $\Delta n_{o,e} = -(\frac{1}{2})n^3_{o,e}r_{13,33}E_z s(x)$, where $E_z$ is an electric field applied along a crystallographic z direction of the EO crystal, $n_o$ and $n_e$ are the ordinary and the extraordinary refractive indices without the applied electric field, respectively, $r_{33}$ and $r_{13}$ are relevant Pockels coefficients for an ordinary incidence wave and an extraordinary incidence wave, respectively, and $s(x)=\pm 1$ and denotes a sign of a crystal-domain orientation of the EO crystal as a periodic function of a crystallographic x direction;

a set of electrodes on the crystal; and a voltage driver connected to the set of electrodes.

2. An EO Bragg deflector according to claim 1, wherein a refractive index of the EO crystal is spatially modulated according to one of a 1D and a 2D spatial modulations of the EO coefficient in the EO crystal when the voltage driver supplies a voltage to the crystal, and the refractive index is homogeneous when the voltage driver ceases to supply the voltage to the set of electrodes.

3. An EO Bragg deflector according to claim 1, in which an incident light wave is deflected by the spatially modulated EO coefficients subject to one of a 1D and a 2D Bragg diffraction conditions when the voltage driver supplies a voltage to the set of electrodes.

4. An EO Bragg deflector according to claim 1, wherein the EO crystal is one selected from a group consisting of a periodically poled lithium niobate (PPLN) crystal, a periodically poled Potassium Titanyl Phosphate (PPKTP) crystal, and a periodically poled Lithium Tantalite (PPLT) crystal.

5. A Q-switched laser system, comprising:

a laser cavity for resonating a light wave;

the EO Bragg deflector as claimed in claim 1 in the laser cavity;

a laser gain medium generating a laser emission in the laser cavity; and a pump source supplying an energy to the laser gain medium.

6. A Q-switched laser system according to claim 5, wherein the laser cavity is at a high-loss (low-Q) state when the EO Bragg deflector deflects the resonant light wave according to a Bragg diffraction condition and is at a low-loss (high-Q) state when the EO Bragg deflector ceases to deflect the resonant light wave.

7. A Q-switched laser system according to claim 6, wherein the EO Bragg deflector is a laser Q-switch controlling the generation of a Q-switched laser pulse by switching the laser cavity between the low-Q and high-Q states.

8. A Q-switched laser system according to claim 5 further comprising a laser-wavelength converter that converts an emission wavelength of the laser gain medium to a different one.

9. A Q-switched laser system according to claim 8, wherein the laser-wavelength converter is one selected from a group consisting of a second harmonic generator, an optical parametric generator, an optical parametric oscillator, a sum frequency generator, and a difference frequency generator.

10. A Q-switched laser system according to claim 8, wherein the EO Bragg deflector and the laser-wavelength converter are monolithically integrated in a single nonlinear-optical-material substrate.

11. A Q-switched laser system according to claim 10, wherein the laser-wavelength converter is a QPM wavelength converter with a laser beam aligned along a grating-vector direction, and grating vectors of the EO Bragg deflector and the QPM wavelength converter are perpendicular to each other.

12. A Q-switched laser system according to claim 11, where the QPM wavelength converter is one selected from a group consisting of a periodically poled lithium niobate (PPLN) crystal, a periodically poled Potassium Titanyl Phosphate (PPKTP) crystal, and a periodically poled Lithium Tantalite (PPLT) crystal.

13. A Q-switched laser system according to claim 10, wherein the laser-wavelength converter is a QPM wavelength converter with a laser beam aligned along a grating-vector direction, and grating vectors of the monolithically integrated EO Bragg deflector and QPM wavelength converter are parallel to each other.

14. A Q-switched laser system according to claim 13, wherein the single nonlinear-optical-material substrate includes a total internal reflector which provides a 90-degree bent to a laser path from the EO Bragg deflector to the QPM wavelength converter and vice versa.

15. A Q-switched laser system according to claim 13 further comprising a set of reflection mirrors for properly deflecting the Q-switched laser pulse back into the monolithically integrated QPM wavelength converter for laser-wavelength conversion.

16. A Q-switched laser system according to claim 13, wherein the QPM wavelength conversion is one selected from a group consisting of a periodically poled lithium niobate (PPLN) crystal, a periodically poled Potassium Titanyl Phosphate (PPKTP) crystal, and a periodically poled Lithium Tantalite (PPLT) crystal.

17. A controlling method for a Q-switched laser system, wherein the laser system comprises a pump source, a laser gain medium, an EO Bragg deflector having a voltage driver and an EO crystal with an ordinary refractive index, an extraordinary refractive index and one of a 1D and a 2D spatially modulated EO coefficients, and a laser cavity, comprising the steps of:

(a) governing a refractive-index change in the EO crystal, $\Delta n_{o,e}$, by an expression: $\Delta n_{o,e} = -(\frac{1}{2})n^3_{o,e}r_{13,33}E_z s(x)$, where $E_z$ is an electric field applied along a crystallographic z direction of the EO crystal, $n_o$ and $n_e$ are an ordinary refractive index and an extraordinary refractive index without the applied electric field, respectively, $r_{33}$ and $r_{13}$ are relevant Pockels coefficients for an ordinary incidence wave and an extraordinary incidence wave, respectively, and $s(x)=\pm 1$ and denotes a sign of a crystal-domain orientation of the EO crystal as a periodic function of a crystallographic x direction;

(b) emitting a resonant light wave in the laser cavity from the laser gain medium after the pump source supplies enough energy into the laser gain medium;

(c) deflecting the pre-aligned resonant light wave in the laser cavity by the EO Bragg deflector with one of the 1D and the 2D spatially modulated EO coefficients when the voltage driver supplies a voltage to the EO Bragg deflector, so that the laser cavity is at a high-loss (low-Q) state; and (d) restoring an alignment of the resonant light wave in the laser cavity by turning off the voltage to the EO Bragg deflector with one of the 1D and the 2D spatially modulated EO coefficients, so that the laser cavity is at a low-loss (high-Q) state for generating a Q-switched laser pulse.

18. A controlling method according to claim 17 further comprising a step of: (e) converting a wavelength of the Q-switched laser pulse into a different one in a laser wavelength converter cascaded to the EO Bragg deflector.

* * * * *